United States Patent
Prabhakar et al.

(10) Patent No.: US 7,441,026 B2
(45) Date of Patent: Oct. 21, 2008

(54) SYSTEM AND METHOD FOR GUARDING AGAINST INFINITE LOOPS FROM MULTI-POINT REDIRECTS IN A MULTI-THREADED ENVIRONMENT

(75) Inventors: Arvind Prabhakar, Sunnyvale, CA (US); Krishnendu Chakraborty, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 986 days.

(21) Appl. No.: 10/617,968

(22) Filed: Jul. 10, 2003

(65) Prior Publication Data

US 2005/0010662 A1   Jan. 13, 2005

(51) Int. Cl.
*G06F 15/16* (2006.01)
*G06F 15/173* (2006.01)

(52) U.S. Cl. ............... 709/224; 709/203; 709/205; 709/217; 709/223

(58) Field of Classification Search ......... 709/217, 709/224, 205, 203, 219, 226, 223
See application file for complete search history.

(56) References Cited

U.S. PATENT DOCUMENTS

| | | | |
|---|---|---|---|
| 5,870,546 A * | 2/1999 | Kirsch | 709/205 |
| 6,098,093 A * | 8/2000 | Bayeh et al. | 709/203 |
| 6,134,588 A * | 10/2000 | Guenthner et al. | 709/226 |
| 6,189,030 B1 * | 2/2001 | Kirsch et al. | 709/224 |
| 6,212,560 B1 * | 4/2001 | Fairchild | 709/223 |
| 6,269,370 B1 * | 7/2001 | Kirsch | 707/10 |
| 6,438,592 B1 * | 8/2002 | Killian | 709/224 |
| 2002/0000262 A1 * | 1/2002 | Vange et al. | 709/245 |
| 2002/0002622 A1 * | 1/2002 | Vange et al. | 709/245 |
| 2002/0002686 A1 * | 1/2002 | Vange et al. | 713/201 |
| 2002/0078191 A1 * | 6/2002 | Lorenz | 709/223 |
| 2002/0095454 A1 * | 7/2002 | Reed et al. | 709/201 |
| 2002/0194483 A1 * | 12/2002 | Wenocur et al. | 713/185 |

* cited by examiner

*Primary Examiner*—Joseph E Avellino
*Assistant Examiner*—Gerald Smarth
(74) *Attorney, Agent, or Firm*—Osha • Liang LLP (57) ABSTRACT

A computer system having a user specified web browsing system for selectively monitoring application request to web based applications to detect and track redirection loops. The web browser of an embodiment of the present invention is configured to track multiple web applications at any given time to determine when to terminate requests to the same application resource when a redirection loops develops to that resource. In one embodiment of the present invention, a user programmable cookie is attached to the web browser to periodically check user specified web applications when a redirection loop is detected. The cookie enables the redirection loop to be terminated when the redirection loop reaches a predetermined maximum number of loops.

10 Claims, 6 Drawing Sheets

SYSTEM AND METHOD FOR GUARDING AGAINST INFINITE LOOPS FROM MULTI-POINT REDIRECTS IN A MULTI-THREADED ENVIRONMENT

FIELD OF THE INVENTION

The present claimed invention relates generally to the field of information processing systems. More particularly, embodiments of the present claimed invention relates to web-based applications handling in a browser environment.

BACKGROUND ART

The World Wide Web (the "web") provides a popular source of information for consumers and business users. Surfing the web has become appealing to both sophisticated and casual users. The web browser has therefore become the primary means of accessing data over the Internet.

Today, a majority of front end client applications run on browsers. The popularity of Internet based applications has increased and the number of these applications has also increased. However, as the number and diversity of web based applications increase, processing these applications does encounter some problems. For example, it is typical for a browser processing a request to an application to result in a number of redirections before reaching an endpoint of the software execution for the application request. Hyper Text Transport Protocol (HTTP) redirections are typical in many browser based applications process and these redirections are normally across multiple points (resources).

Figure 1:
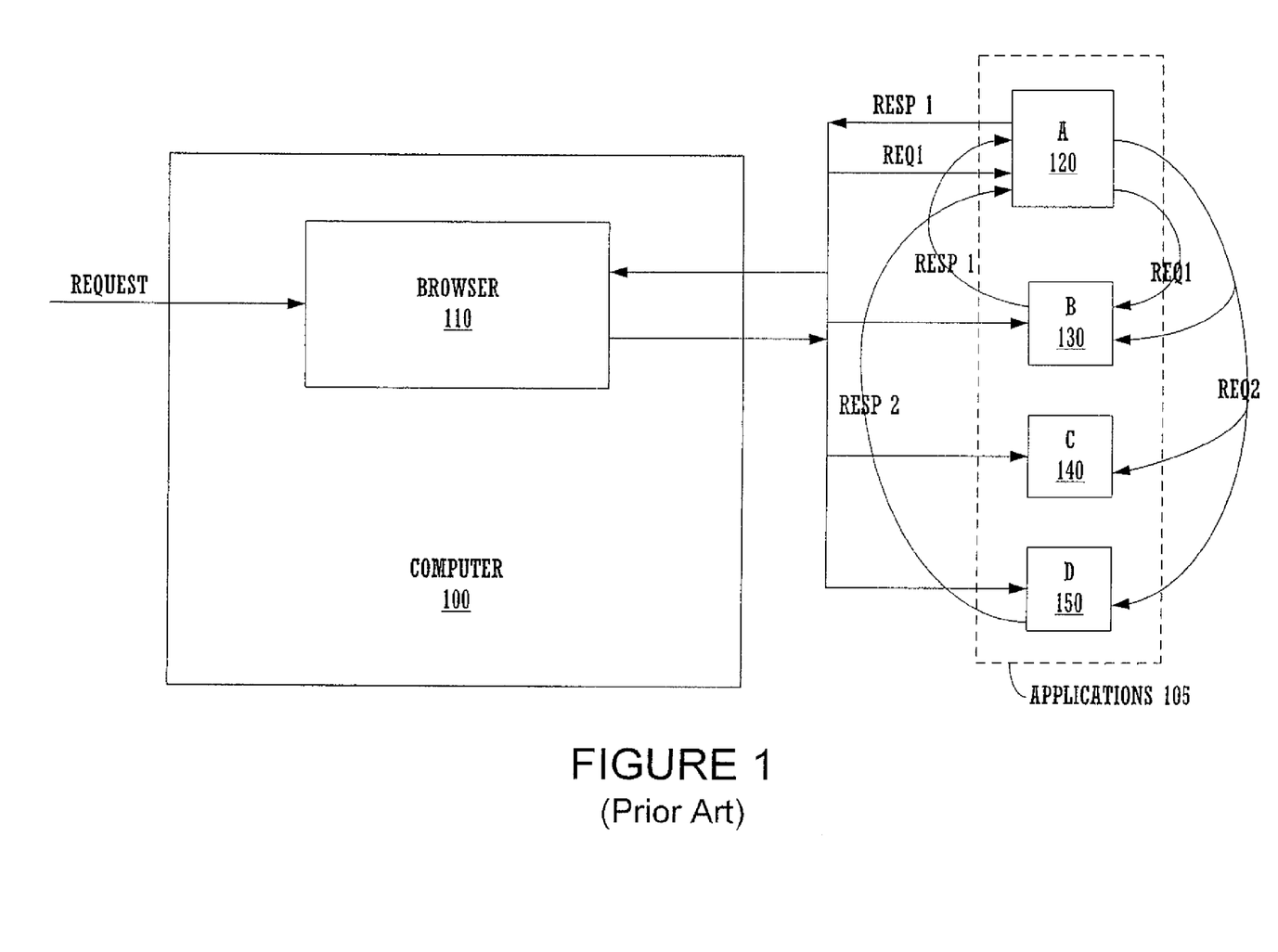
FIG. 1 is a block diagram of a conventional Internet browser system.

FIG. 1 is a block diagram illustration of a typical browser configuration in the prior art. In the illustration in FIG. 1, a user typically accesses web applications 105 via web browser 110. In FIG. 1, the user can access different resources 120-150 by accessing each individual web application to access the data the user desires. In trying to process a user's request to any of the resources 120-150, the user may become redirected, for example, from resource A 120 to resource B 130 and then to resource C 140. Redirections that result in accessing multiple resources (e.g., resources A 120-D 150) are referred to as multiple point redirections. Redirections to a single resource are referred (e.g., from A to B) to as a single point redirections.

Although the programming logic of Internet based software should finally redirect a user directly to a requested resource, very often due to bugs in the underlying software code and/or the wrong user configurations this may not always happen. Consequently, multiple point redirections in a HTTP based browser is very common. Unfortunately, a redirection that results in a resource request going from one resource to a number of other intermediary resources can often result in a redirection loop. Redirection loops are common in both single and multiple point redirections. In many web based applications, redirection loops can be infinite.

An infinite redirection loop can overload the underlying central processing unit of the computer system thereby detrimentally affecting performance of the overall system and rendering useless the software applications running on the service. Infinite loop redirections can also compromise a system's security by exposing the underlying computer system to malicious unauthorized attacks as applications request are in loops on the Internet. Potentially, worse yet infinite loops caused by redirections can result in denial of service at the resource or hosting server.

Thus, for the prior art user to access content from multiple web applications, the user sometimes encounters access to these applications being denied or inordinate waiting time to complete a simple access task. A system that reduces the number of application redirects in a web based browser applications is therefore desired.

SUMMARY OF INVENTION

Accordingly, to take advantage of the myriad of web applications and content on the Internet, a system and for method are described for managing intercommunication of applications in a multi-threaded environment to allow an efficient and expeditious processing of user requests to these applications. A need exists for "out-of-the-box" web applications content delivery system solutions to allow a wide range of applications to be processed and delivered to end-users connecting to the Internet environment with minimal interruption and redirecting communications between applications. The present invention provides such system and method.

Embodiments of the present invention are directed to a system and a method for controlling inter-application communication in a multi-application environment which prevents infinite loops caused by redirects. In general, embodiments of the present invention vary the degree of providing web content to a user connecting to the web environment by implementing user specified application monitoring to limit the number of redirects that an application may encounter based on predetermined user specified requirements. In other words, in one embodiment the invention provides user specific application monitoring in an Internet browser environment for preventing infinite loops caused by single point and multi point redirections.

Embodiments of the present invention also include an Internet browser that is user programmable to dynamically and automatically track a user's request to applications in the multi-application environment. The browser tracks the number of response points the user's request traverses in order to respond to the particular request, thereby allowing redirection loops to be identified.

Embodiments of the present invention also include an application data tracking unit that tracks the number of redirects that an application request encounters in the multi-application environment. The application data tracking unit may be a persistent data unit that may be programmed to store the number of redirects that an application may have to go through. In one embodiment of the present invention, the data tracking unit may be temporary for each application request session. In one embodiment, a cookie may be used to perform tracking. The temporary data tracking unit tracks application redirects for the particular session and terminates after the session is over. Multi point and single point redirects are tracked in this way according to one embodiment.

Embodiments of the present invention further include a redirect counter that counts the number of redirects an application request encounters during processing. The counter is programmable by a user to set a termination point of an application redirect for each application request. The counter can be programmed for a particular resource traversal and can be reset upon a loop break condition. Multiple counts are possible for multiple resource traversal types.

Embodiments of the present invention further include a request monitoring module for tracking a user's access to web applications. The monitoring module allows the present invention to determine which applications to terminate after a predefined period of time in order to perform loop breaking. Terminating applications processing may be based on a user defined content type, the frequency at which said content may be accessed and processed. Edge condition processing is also provided to prevent looping as a result of a loop break condition.

Embodiments of the present invention further include application security protection unit that protects the underlying computer system from unauthorized intrusion resulting from the redirection of applications as they are processed in the multi-application environment. The application security protection unit uses a denial of service attack scheme to prevent unauthorized access to applications as the applications are in a redirect loop.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The invention is directed to a system, an architecture, subsystem and method to manage user application requests in a multi-application device independent browser environment in a way superior to the prior art. In accordance with an aspect of the invention, a computer system provides application request processing and presentation which enables user specified web applications to be scoured in determining the type of application to present to the user while managing the number of redirects a request encounters when being processed.

In the following detailed description of the present invention, a system and method for an Internet protocol based communication system is described. The invention can be more fully described with reference to FIGS. 2 through 6.

Figure 2:
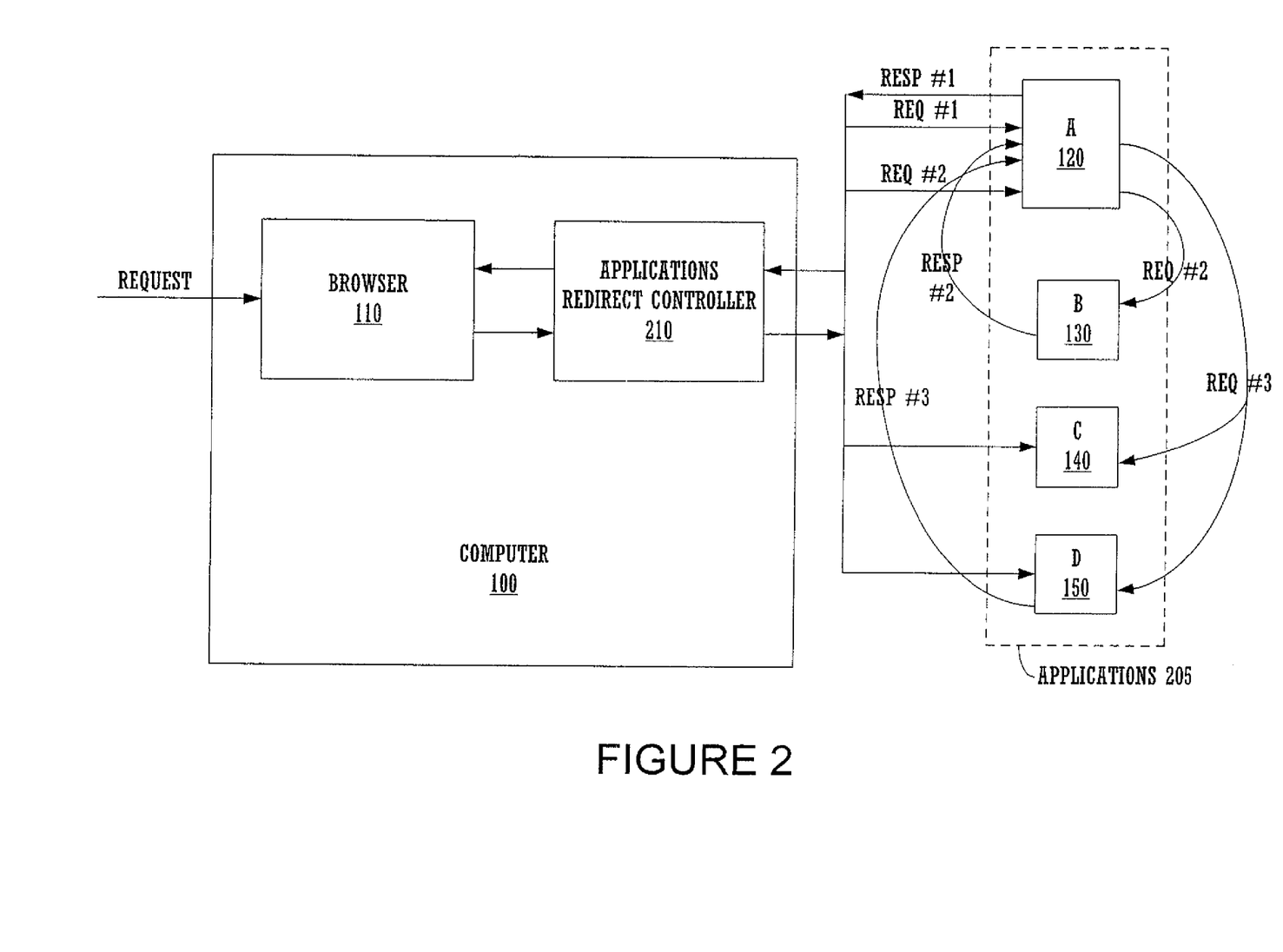
FIG. 2 is a block diagram of an embodiment of the present invention.

FIG. 2 is a block diagram depiction of one embodiment of the Internet browsing environment of the present invention. As shown in FIG. 2, the Internet browsing environment 200 of the present invention comprises computer system 100 having a browser 110, a application redirect controller 210 and web application 205 with exemplary application points 120-150. In the web browser environment shown in FIG. 2, application redirect controller 210 may function as a proxy to the browser 110 in computer system 100 to provide a safeguard against infinite loops caused by single point or multi point redirects between resource via the browser 110.

The application redirect controller 210 includes components that periodically query web application 205 according to a user defined configuration file. The application redirect controller 210 detects changes (redirects) in the processing of application requests to specific web applications and summarizes those redirects and delivers it to the user. In one embodiment of the present invention, the summary of redirects presented by the application redirect controller 210 determines how the user may wish to have a subsequent application request to the same application point processed by the computer system 100. The applications redirect controller 210 also includes logic to monitor the processing points (destinations) 120-150 from various web sites or application destinations and uses the information to modify or determine whether to terminate a particular application request being processed.

In one embodiment of the present invention, the applications redirect controller 210 prevents redirects on a computer system after a predetermined limit. If infinite redirects are allowed to continue, the redirects will cause the computer system to shut down and take up resources on the computer system. The applications redirect controller 210 therefore provides a mechanism to guard against code written with good or malicious intent from taking away resources in the underlying computer system.

As shown in FIG. 2, a user's request (REQ 1) to point A 120 in the application may result in a redirect from point A 120 to point B 130. Such a redirection is a single point redirection. Consequently, instead of the request being processed only at point A 120, the application redirects the request from point A 120 to point B 130 before responding (e.g., RESP 1) to the user. The browser and the controller 210 are aware of the redirect. Such a request processing is referred to as a single point redirect e.g., from A to B directly. In this case, the applications redirect controller 210 is now aware of how REQ#1 was processed. If a soon after subsequent request to point A 120 (e.g., REQ#2) again results in a redirection to point B 130, the applications redirect controller 210 assumes that a single point redirection loop may be forming between point A 120 and point B 130 for the particular user request.

The assumption of a redirect between point A 120 and point B 130 triggers a redirect tracking scheme of the applications redirect controller 210.

In one embodiment of the present invention, the applications redirect controller 210 starts to register data in a cookie only when the applications redirect controller 210 detects an infinite loop for redirect. The application redirect controller 210 resets the data in the cookie the moment it detects that the redirect is not from an infinite redirect. In one embodiment, a count value is associated with the particular redirect and this information can be stored in a cookie associated with the session.

In a multi point redirect, a request REQ # 3 is redirected from point A 120 to point C 140 and point D 150. A subsequent request that results in a loop between points A 120, C 140 and D 150 will generate a response RESP #3. When a request results in a multi point redirect loop, the applications redirect controller 210 initiates cookies that track each redirection (e.g., point A 120 to point C 140 and point C 140 to point D 150). In one embodiment, a count values is associated with each of the redirects between points A 120, C 140 and D 150 and this information can be stored in each cookie associated with the request session.

In one embodiment of the present invention, the applications redirect controller 210 is configurable by a user to set the maximum number of redirects that may be allowed in the computer system 200. Setting the number of redirects enables the applications redirect controller 210 to terminate an application processing that exceeds the preset the maximum number of redirects that the system 200 allows for each applications, in an effort to break are terminate an infinite loop situation, it is appreciated that certain web site transitions that are indicative of a loop not in fact forming will reset the established count value. In one embodiment of the present invention, the applications redirect controller 210 is configurable to be active or inactive depending on the use case senario.

In one embodiment of the present invention, the applications redirect controller 210 also provides a reusable generic process for multi-point HTTP based infinite redirection protection independent of or transparent to the web server or applications server that is running the applications redirect controller 210. The applications redirect controller 210 provides a generic way to prevent systems from infinite loops in multi/single point HTTP redirects. In one embodiment of the present invention, the applications redirect controller 210 monitors web browser applications request process for HTTP based applications.

Figure 3:
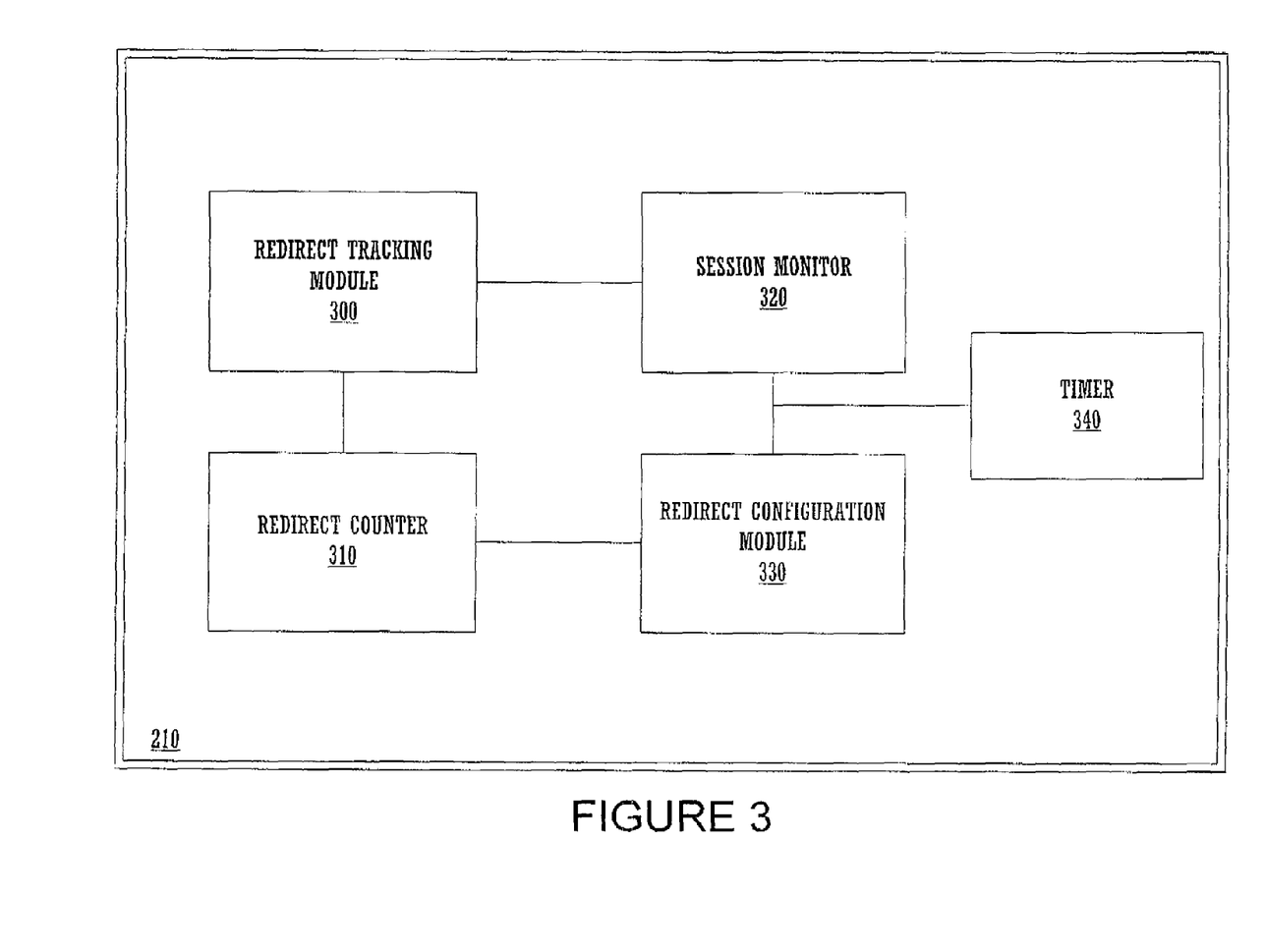
FIG. 3 is a block diagram of an exemplary internal architecture of the application redirect consolidator of an embodiment of the present invention.

FIG. 3 is a block diagram illustration of one embodiment of the applications redirect controller 210 of the present invention. The applications redirect controller 210 comprises redirect tracking module 300, redirect counter 310, session monitor 320 and configuration module 330. In one embodiment of the present invention, the applications redirect controller 210 may also comprise a timer 340. In one embodiment of the present invention, the applications redirect controller 210 is pluggable into any computer system framework that works on the HTTP protocol. Thus, the applications redirect controller 210 can be superimposed on already existing code without touching any legacy code.

In one embodiment of the present invention, when a user issues a request to any point in an application and the point results in a redirect as the prior request, the redirect tracking module 300 tracks the response to the request. In a subsequent access to the same point in the same application that results in the same redirect, the redirect tracking module 300 tracks that particular redirection by the application for a certain number of attempts that is predefined in the redirect counter 310. By tracking the applications redirection in a loop between single or multiple points, the applications redirect controller 210 is able to restrict or regulate the number of redirects between points in the same application or across applications to break potential infinite loops.

In one embodiment of the present invention, the redirect counter 310 is programmably set by a user for a particular application or for a group of applications. As an application reaches a redirect attempt defined in the redirect counter 310, the redirect tracking module 300 terminates the request to the application. It is appreciated that if the termination action itself is a redirection, then this termination redirection is also monitored by the controller 210 and may be broken, if looping by redirection to a blank page.

In one embodiment of the present invention in which the application redirect controller 210 implements timer 340, the redirect tracking module 300 will track redirects by the application for a certain predefined period of time. The timer 340, when implemented, may be preset by the user to terminate redirects by a particular application or group of applications. In other words, the user may preset how long an application may wait to process a request to a particular point in the application when the user commences a request session for that particular application. The user may preset the timer 340 when the user logs on into the underlying computer system and any requests by the user to web applications are then automatically tracked by the redirect tracking module 300 for applications redirect loop.

In one embodiment of the present invention, the tracking module 300 uses cookies as a system for tracking redirects in applications. The cookie is programmable to the underlying browser 110 that the user may be using. The browser 110 monitors the user's request to the application and returns a result of to the cookie which is then returned to the applications redirect controller 210 with any redirection information. By using cookies to track application redirects, the applications redirect controller 210 is browser and operating system independent.

The applications redirect controller 210 is then able to evaluate the results to determine whether the application is in a redirection loop and needed to be tracked. If the applications redirect controller 210 determines that the application is to be tracked, the tracking module 300 is initiated on a subsequent request to the same point (e.g., point A 120 in FIG. 2) in the application. However, if the applications redirect controller 210 receives the cookie from the browser 110 and determines that the application processed a request without any redirection, the redirect tracking module 300 is not initiated as the applications redirect controller 210 does not anticipate a redirect loop in the applications.

In one embodiment of the present invention, the counter 310 is stored in the cookie where a redirect loop is present to monitor the number of attempts that the application in the redirect loop processes a request. If the request processing reaches a predetermined number of attempts, then the applications redirect controller 210 assumes that the application is in a redirect loop. Any subsequent request to the same point in the application that triggered the redirect loop is not processed. In one embodiment of the present invention, a request to a particular point in an application that results in a redirect between two points (e.g., point A 120 and point B 130) is deemed as a single point redirect.

Still referring to FIG. 3, the session module 320 monitors the user request to determine which cookie the user is using. The session monitor also temporary stores the user's browser and cookie activities to the Internet. The configuration module 330 couples to the redirect tracking module 300 to configure the user's request to the applications. In one embodiment of the present invention, the redirect configuration module 330 may enable a user to configure access around particular points in an application if those points tend to generate redirect loops that create processing overloads in the underlying computer system.

Figure 4A:
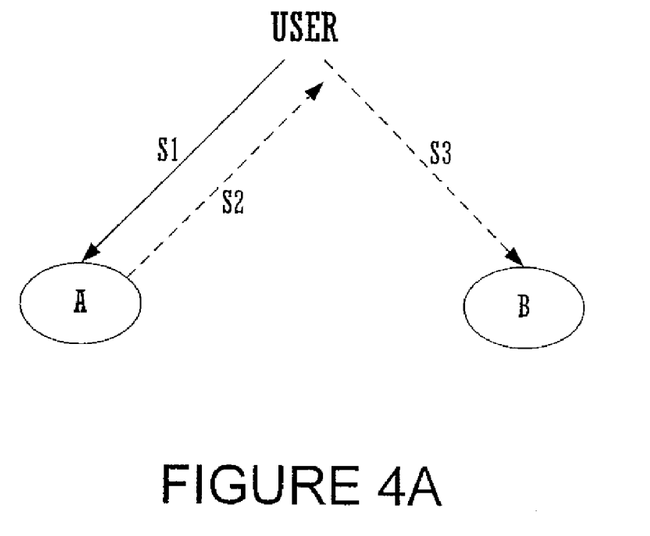
FIG. 4A is an exemplary illustration of an embodiment of a single point redirect configuration of the browsing environment of the present invention.

FIG. 4A is an exemplary depiction of one embodiment of the a single point redirection of the present invention. As shown in FIG. 4A, when a user issues a request (e.g. step S1) to resource A, the request is processed via a redirection (e.g., steps S2 and S3) to resource B. In one embodiment of the present invention, resource A will have the protection of the applications redirect controller 210 to monitor and protect the occurrence of redirect loops to resource A. In the example shown in FIG. 4A, when the user issues a subsequent request, the applications redirect controller 210 will be initiated to monitor the processing of the request. If the request goes through the same processing sequence (e.g., steps S1, S2 and S3), the redirect counter is incremented by one. The counter will continue to be increased if the same request goes through the same sequence of processing until the counter reaches the predetermine maximum number of redirects that the system handles or until an inconsistent request is encountered, e.g., A to C. When the maximum redirection count is reached, the applications redirect controller 210 terminates any subsequent requests to resource A. If an inconsistent request is seen, then the counter is reset. It is appreciated that the counter may also be reset if a predetermined amount of time lapses between redirections thereby indicting valid user activity and not loop behavior. In one embodiment of the present invention, the cookie for a single point redirect is fixed.

Figure 4B:
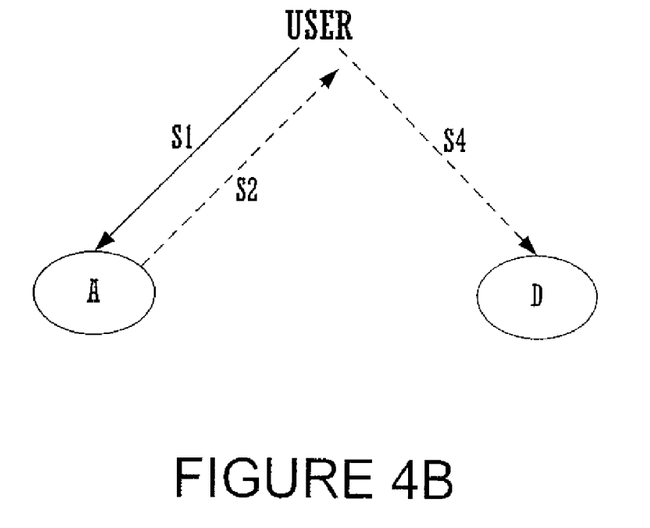
FIG. 4B is an exemplary illustration of an embodiment of a temporary session a single point redirection of the browsing environment of the present invention.

In FIG. 4B, the user's request to point (resource) A now gets redirected to point D which is an access denied page in response to the maximum count value being reached. In one embodiment of the present invention, the applications redirect controller 210 blocks against denial of service attacks that may result from infinite loops on an HTTP based server. When the user's request is redirected to the access denied page, the applications redirect controller 210 stops monitoring the current request. However, the applications redirect controller 210 will initiate the redirect tracking module 300 to track both points A and D. A loop detected in the access denial page may result in a redirect to a blank page. In one embodiment, the applications redirect controller 210 allows users to configure the denial of service page displayed after detecting the infinite loop. It also guards the user from getting into an infinite redirect loop while being redirected to the deny page. Thus, the probability of getting into an edge case where the user could get into an infinite loop while being directed to the deny page is eliminated.

Figure 4C:
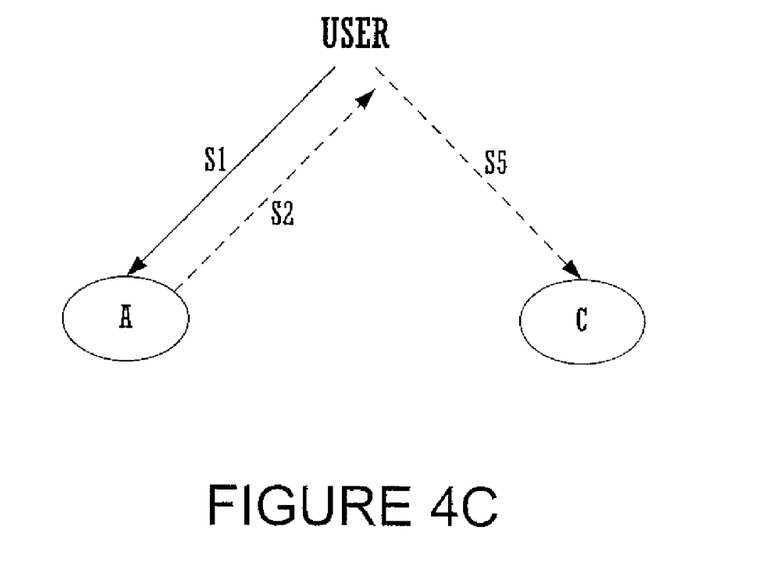
FIG. 4C is an exemplary illustration of an embodiment of a redirect counter setting for a single point redirect of the browsing environment of the present invention.

FIG. 4C is an exemplary illustration of one embodiment of a cookie reset and naming implementation of the present invention. In the example shown in FIG. 4C, a user's request to point A is redirected to point C. The redirect to point C is different from the prior redirection to point B in FIG. 4A. The redirection to point C is an indication to the applications redirect controller 210 that the request to point A was not in a redirection loop with point B. Consequently, the cookie that is configured to track the redirection between point A and B is extinguished. A new cookie is configured to track the redirection between points A and C. In one embodiment of the present invention, each cookie is configurable with the names of the points being tracked as unique identifiers which allows for multi point loop tracking. For example, in tracking points A and C, the cookie may be name ACcookie, etc. In one embodiment of the present invention, the cookie is configured with the request, response and counter information for each point being tracked.

Figure 4D:
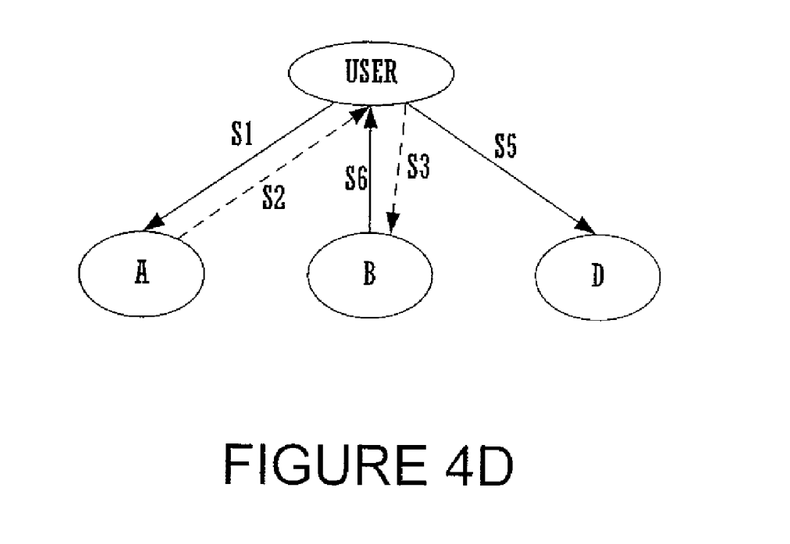
FIG. 4D is an exemplary of an embodiment of a redirect counter setting for a multi-point redirection of the browsing environment of the present invention.

FIG. 4D is an exemplary illustration of one embodiment of a multi-point redirection tracking of the present invention. As shown in FIG. 4D, a request from the user to point A that results in a redirection to point B causes the applications redirect controller 210 to initiated a cookie to track the redirection between points A and B. At the same time a request to point B that results in a redirection to point C results in a cookie being set to track the redirection between points B and C. In one embodiment of the present invention, the name of a cookie that tracks redirection between points A and B is based on the source and destination of the redirect (e.g., A-B or B-A).

As subsequent requests to points A and B result in redirections to pints B and C respectively, the cookie counter is increased for each of the cookies tracking the redirections between points A and B and points B and C. As each direction reaches the maximum predefined redirection count, the respective tracking cookies will terminate further subsequent access request to both points A and B. In one embodiment, the cookies generated for a multi point redirection monitoring needs to store the count value and the identification of the resources involved in the redirect sequence. From this information, multi point loops can be tracked (e.g., A-B count i; B-C count j and C-A count k, etc.). In one embodiment of the present invention, for multi point redirections, the applications redirect controller 210 provides a mechanism in which cookie names are based only on the source of the request. So that if the source of the request is "A" and the redirect destination is "C", then the name of the cookie tracking the request will be based only on "A" and not on "A"-"C" together.

Figure 5:
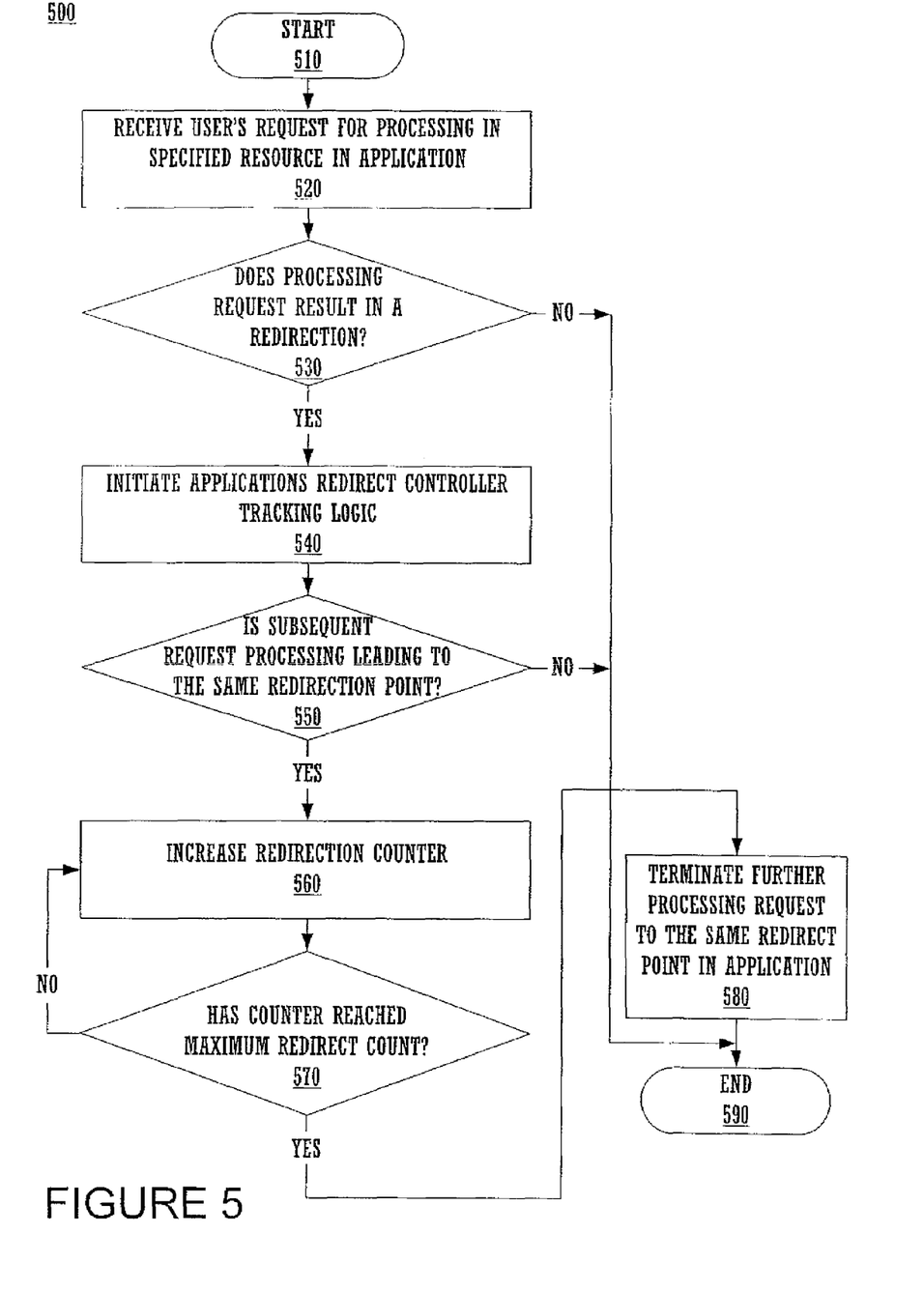
FIG. 5 is an exemplary computer implemented flow diagram of the application redirect control and handling processing in an embodiment of the present invention.

Reference is now made to FIG. 5 which is a computer implemented flow diagram of the operation of one embodiment of the present invention. The applications redirect controller process of one embodiment of the present invention illustrated in FIG. 5 is a single point redirection process. In this example, the application redirect controller 210 is initiated at step 520 when the user issues a request to a particular request point (e.g., point A) in an application via a connection to the user's local browser.

At step 530, the applications redirect controller 210 checks to determine if the user's request to the requesting point in the particular application resulted in a redirection. If processing the user's request did not result in a redirection, the application redirect controller 210 terminates monitoring the request.

In an embodiment in which a timer is used to track redirects, if the user's request does not result in a redirection (e.g., request processed within predefined processing time), the application redirect controller 210 terminates monitoring the request. If the predefined processing time lapses while the request is still being processed, a redirection is assumed and the counter value is increased. The applications redirect controller 210 resets the counter in a subsequent request that does not result in a redirection.

If on the other hand, the request processing results in a redirection, the applications redirect controller 210 initiates a cookie to track processing the request to the same point on subsequent requests by the user at step 540. At step 550, the applications redirect controller 210 checks to determines whether a subsequent request by the user to the requesting point (e.g., point A) to the same application results in the same redirection as the prior redirection. If the subsequent request processing results in the same redirection, the applications redirect controller 210 assumes processing of the request to be in a redirection loop and increments the redirection counter for the requesting point.

At step 560, the applications redirect controller 210 checks to determine whether the redirect counter set for the requesting point (e.g., point A) has reach the maximum predetermined redirection count. If the maximum redirection count is reached processing terminates at step 580 and the monitoring for the particular request stops at step 590.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications that are suited to the particular use contemplated. It is intended that the scope of the invention be defined by the claims appended hereto and their equivalents.

The invention claimed is:

1. A method for detecting a redirection loop, comprising:
    receiving a first request to process a first web destination;
    identifying a first redirection from the first web destination to a second web destination when processing the first request;
    initiating tracking logic based on the first redirection;
    receiving a subsequent request to process the first web destination;
    identifying, using the tracking logic, a subsequent redirection from the first web destination to the second web destination when processing the subsequent request; and
    incrementing a counter when the subsequent redirection from the first web destination to the second web destination occurs within a predefined time limit.

2. The method of claim 1, wherein the tracking logic identifies the first web destination and the second web destination.

3. The method of claim 1, wherein the predefined time limit is user configurable.

4. The method of claim 1, further comprising:
    detecting the redirection loop when the counter exceeds a predefined maximum number of redirections.

5. The method of claim 4, further comprising:
    terminating processing to the second web destination.

6. The method of claim 1, further comprising:
    resetting the counter when the predefined time limit elapses after any redirection from the first web destination to the second web destination.

7. The method of claim 1, wherein the counter is stored in a cookie.

8. The method of claim 1, wherein the tracking logic stores an identifier of the first web destination in a cookie.

9. The method of claim 1, wherein the first redirection is performed via at least one intermediate web destination.

10. The method of claim 1, wherein the tracking logic is connected to a web browser.

* * * * *

UNITED STATES PATENT AND TRADEMARK OFFICE
CERTIFICATE OF CORRECTION

PATENT NO. : 7,441,026 B2 Page 1 of 1
APPLICATION NO. : 10/617968
DATED : October 21, 2008
INVENTOR(S) : Arvind Prabhakar et al.

It is certified that error appears in the above-identified patent and that said Letters Patent is hereby corrected as shown below:

On the Cover Page, item (56) References Cited, U.S. Patent Documents, line 8, Col. 2, "2002/0000262 A1 * 1/2002 Vange et al....709/245" should be deleted.

Signed and Sealed this

Twenty-seventh Day of January, 2009

JOHN DOLL
*Acting Director of the United States Patent and Trademark Office*